United States Patent
Van Driel et al.

[19]

[11] Patent Number: 5,917,813
[45] Date of Patent: Jun. 29, 1999

[54] MULTIPLE ACCESS TELECOMMUNICATION NETWORK

[75] Inventors: Carel J. L. Van Driel; Petrus A. M. Van Grinsven, both of Eindhoven, Netherlands

[73] Assignee: U.S. Philips Corporation, New York, N.Y.

[21] Appl. No.: 08/735,633

[22] Filed: Oct. 23, 1996

[30] Foreign Application Priority Data

Oct. 23, 1995 [EP] European Pat. Off. ............. 95202853

[51] Int. Cl.⁶ .................................................. H04L 5/22
[52] U.S. Cl. ......................... 370/348; 370/443; 370/449
[58] Field of Search .................................. 370/321, 322, 370/337, 347, 348, 449, 442, 443, 431, 461, 522, 346, 447, 445, 462; 340/825.07, 825.08, 825.5

[56] References Cited

U.S. PATENT DOCUMENTS

| | | | |
|---|---|---|---|
| 4,763,320 | 8/1988 | Rudolph et al. | 370/449 |
| 4,907,224 | 3/1990 | Scoles et al. | 370/443 |
| 4,937,818 | 6/1990 | Sonetaka | 370/95.3 |
| 5,008,883 | 4/1991 | Eizenhofer et al. | 370/348 |
| 5,010,329 | 4/1991 | Nagakura | 370/449 |
| 5,166,675 | 11/1992 | Amemiya et al. | 370/449 |
| 5,172,375 | 12/1992 | Kou | 370/322 |
| 5,384,777 | 1/1995 | Ahmadi et al. | 370/347 |
| 5,740,167 | 4/1998 | Taketsugu et al. | 370/337 |

FOREIGN PATENT DOCUMENTS

0228709A2   7/1987   European Pat. Off. ........ H04B 7/185

*Primary Examiner*—Chau Nguyen

[57] ABSTRACT

A multiple access telecommunication network wherein a primary station is coupled to a plurality of secondary stations by a shared transmission medium. Depending on traffic volume it is advantageous to be able to change the type of access protocol employed by the secondary stations in order to prevent deterioration of transmission efficiency. Accordingly, the access protocol is set by the primary station by transmitting to the secondary stations a channel indicator indicating where in an uplink frame a secondary station can submit its access request. The primary station may also specify the message key which a secondary station must use when transmitting an access request. Applicable to multimedia networks using CATV systems.

10 Claims, 2 Drawing Sheets

MULTIPLE ACCESS TELECOMMUNICATION NETWORK

BACKGROUND OF THE INVENTION

1. Field of the Invention

The present invention relates to a multiple access telecommunication network comprising at least one primary station which is coupled via a shared transmission medium to a plurality of secondary stations, said secondary stations each comprising access request means for transmitting an access request to the primary station The present invention also relates to a primary station, a secondary station and a method for use in such a telecommunication network.

2. Description of the Related Art

A telecommunication network according to the preamble is known from the conference paper "Network Evolution for End User Access to Interactive Digital Services" by C.-J. L. van Driel and W. A. M. Snijders, Proceedings of "The Last Mile of the Information Superhighway", IBC conference, Sydney, August 1994.

Such telecommunication networks are used for communication between several secondary stations and a primary station, via a transmission channel which is, at least partially, common to some of the secondary stations. Such transmission channel can comprise an optical fibre, a coaxial cable, or a radio link. Application of such transmission systems can be passive optical networks, cable TV systems, local area networks, multimedia networks, systems for satellite communication and mobile radio systems.

In transmission systems utilising a common channel for some secondary stations it must be ensured that no interference is caused by secondary stations simultaneously transmitting information to the primary station. To ensure an adequate service for the secondary stations, it also is required that the efficiency of the data transport over the network be high, in particular under heavy load conditions.

A problem with the present access protocols is that the efficiency can deteriorate rapidly under heavy load conditions, which can lead to a total collapse of the network.

SUMMARY OF THE INVENTION

The object of the present invention is to provide a network according to the preamble in which the efficiency deterioration under heavy loads is reduced.

Therefor the network according to the invention is characterised in that the primary station comprises transmission means for transmitting a channel indication to at least one secondary station, said secondary station comprises indication receiving means for receiving the channel indication, and in that the access request means are arranged for transmission of the access request on at least one channel in dependence on the channel indication received by the secondary station.

By transmitting a channel indication to the secondary stations, it is possible to gain control over the access requests transmitted by the secondary stations. The access channel indicator can specify an access channel by specifying e.g. a frequency of an access channel, a time slot in a frame or a bit position in an access time slot comprising a plurality of bit positions. It becomes possible to direct the access requests from different secondary stations to different channels to even the load on a plurality of access channels. It is also possible to deny access for any individual secondary station by transmitting a channel indication which indicates that access for that secondary station is denied. The invention also allows a change of access protocols by simply transmitting a new channel indication.

An example is the switch over from a collision protocol which can be used at low load conditions to a collision free protocol under heavy load conditions. In the collision protocol the same channel identification is transmitted to different stations, resulting in a reduced number of access channels. In the case of a collision free protocol, a different channel identification is transmitted to each of the secondary stations, which will lead to an increased number of access channels required, but which resolves the decreased efficiency due to a large number of collisions.

An embodiment of the present invention is characterised in that the transmission means are arranged for transmitting an indication of a form of an access request message said secondary station, the receiving means of the secondary station being arranged for receiving said indication of the form of the access request message, and in that the access request means are arranged for transmitting an access request message having a in accordance with the indication of the form of the access request message which has been received.

By specifying a form of an access request message by transmitting it to the secondary stations, it becomes possible to implement virtually any desired access protocol. By specifying the access channel to be used and the form of the request message to be transmitted, all required information is available at the secondary stations.

A further embodiment of the present invention is characterised in that the access request means are arranged for modulating a signal representing the access request on a carrier burst, and in that the channel indication indicates the starting instant and duration of the carrier burst. The use of one or more carriers for transporting the uplink traffic is in particular suitable for hybrid fibre-coax systems.

Such embodiment is in particular useful when the network comprises a large number of subscribers, because it allows the use of a combination of time division multiple access and frequency division multiple access. However it is also possible that only one access carrier is present in the network.

A further embodiment of the invention is characterised in that the channel indication comprises an address of a previously stored channel key specifying begin and duration of the access request.

In order to be able to switch rapidly between different protocols, it is convenient to transmit an address of a channel indicator to the secondary station instead of the complete channel indicator. The channel indicator itself can be transmitted once to the secondary station in a start up procedure.

BRIEF DESCRIPTION OF THE DRAWING

The invention will now be explained with reference to the drawings. Herein shows.

DESCRIPTION OF THE PREFERRED EMBODIMENTS

Figure 1:
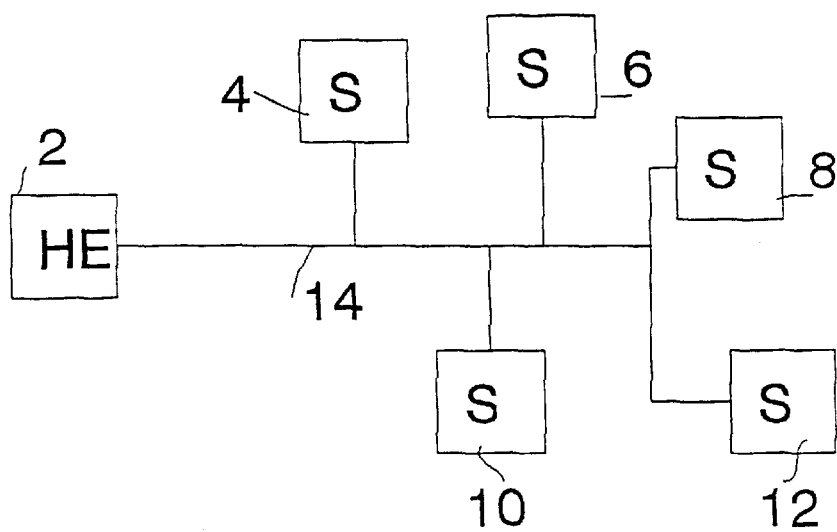
FIG. 1, a transmission system in which the invention can be used.

The network according to FIG. 1 comprises a primary station being here a head end 2 which is coupled by a transmission medium 14 to a plurality of secondary stations 4 . . . 12. The transmission medium is partly in common for a plurality of secondary stations. Since the transmission medium is shared among a number of users some kind of access protocol has to be implemented. In order to inform the head-end 2 whether one of the secondary stations 4 . . . 12 wants to transmit data to the head end 2, it first has to transmit some request information in a dedicated time slot in the request area.

According to the inventive concept a general Medium Access protocol structure, (MAC-protocol), is provided that covers a number of collision free and collision resolution protocols. In general the secondary stations transmit their data in an uplink frame which comprises payload cells and one or more access request channels. There are roughly two different approaches to use access request cells. They can be used in a collision free way, but it is also possible that collisions in the request area are allowed. If collisions are allowed, an additional collision resolution or collision resolving algorithm is required. The present invention is related to a MAC-protocol structure that supports both approaches or hybrids of it.

Figure 2:
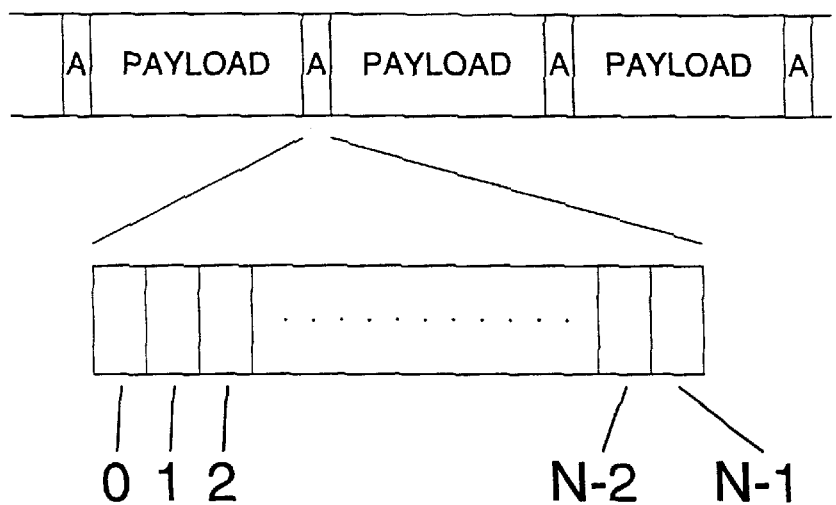
FIG. 2, a first embodiment of an uplink frame to be used with the invention.

FIG. 2 shows a first embodiment of an upstream frame. The largest parts are use for transmitting payload data. The smaller parts, also called request cells, are reserved for transmitting access request. In the uplink frame according to FIG. 2 the request cells are subdivided in N parts, each of said parts being reserved for one of the N secondary stations. Every secondary station has a fixed number of symbols in a request cell in which it is allowed to place requests for bandwidth. Since this location is unique for each secondary station, collisions on requests are avoided. As a result each request is immediately handled by the head-end 2.

Figure 3:
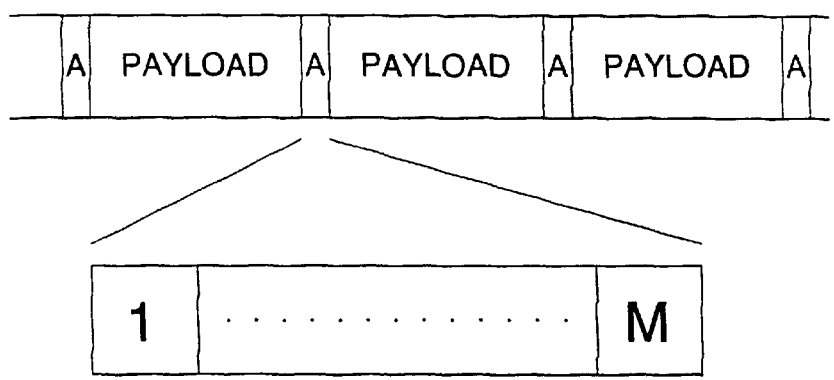
FIG. 3, a second embodiment of an uplink frame to be used with the invention.

In FIG. 3 an uplink frame is drawn for use with a MAC-protocol where collisions are allowed. The access cell is subdivided into M (M<N) so-called mini-slots for submitting access requests. In this protocol, a user who has to transmit data sends randomly an access request in any of the M mini-slots in the request cell. If there is no other user sending a request in that mini slot at the same time, the request arrives safely at the head-end 2. The head-end will broadcast the request back to all stations, such that all stations know that the corresponding time-slot is reserved for that user which can then transmit its data in a corresponding time-slot in the payload area.

In case more users have sent their request in the same mini-slot there is a collision that means that none of the requests can be taken into account by the head-end. The head-end then starts a collision resolution procedure for these secondary stations.

During this collision resolution procedure no other stations are allowed to place requests. After the collisions are resolved, the requesting stations each receive a time-slot to transmit their data packet and the head-end re-opens the request period for all stations.

In the protocol according to FIG. 1 unique locations in the request area cells are reserved for every subscriber. In case of a large number of subscribers this might cause too much overhead. However, for a large number of subscribers some statistics can be applied depending on the number of active users. Suppose that we supply each subscriber with a unique key instead of a unique location in a request cell. If the set of keys is chosen properly and if we allow some collisions, a possible improvement can be achieved using a collision resolving algorithm based on CDMA techniques. In this case it might be possible to extract directly by means of correlation techniques the addresses of all users which caused a collision in the request area. It has to be investigated what the performance is of a CDMA based collision resolution algorithm. A big advantage would be that there is no additional delay due to the repeated iterations which are necessary in a standard collision resolution protocol, and that within one request cycle more than one subscriber at a time can be assigned a number of mini-cells to transmit their data packets. This approach can be seen as a hybrid form between the protocol according to FIG. 1 and the protocol according to FIG. 2.

The basic difference between the MAC-protocols described above is the form of the access request message in the so-called request cells and handling of incoming requests by the head end 2. The MAC-protocol is thus being implemented by the handling procedure in the head end 2. It is important to note that in the secondary stations 2 there is a need for a processor that now can cope with all request handling procedures. In order to clarify that this can be implemented in a simple way an example is given. This example illustrates how different protocols can be implemented. Consider the form of an access request message as being described by two keys. The length of these keys equals the number of symbols in a request cell.

In this example key #1 is a string of 0's and 1's, where a "0" means "carrier off" and a "1" means "carrier on". Key #2 is a string of symbol values indicating which symbol values have to be transmitted at the corresponding position in the request cell.

By means of these two keys the requests for the protocol according to FIG. 1 can be described as follows:

Key #1 is an all-zero string, except at position #i corresponding to secondary station i, and key #2 is a string of constant values.

In case of a protocol according to FIG. 2 the keys are defined as follows: Key #1 is all-zero except at the symbol locations corresponding to each request mini-slot. Key #2 contains a unique symbol combination which is related to the secondary station's address. Next the general procedure of describing different MAC protocols by means of a number of keys will be dealt with. For this general description three keys (one more than in the simple example above) are defined. They are called key_a, key_b and key_c. Key_a is defined by the string that specifies the symbols that can be used for transmission. It is an embodiment of the channel indication according to the inventive concept. The string consists of 0's, 1's and 2's, where a "0" means "carrier off at this symbol position in a request cell", a "1" means "carrier at for transmitting an id number on this symbol position in a request cell" and a "2" means "carrier on for transmitting a message on this symbol position in a request cell".

key_b is defined as an id number (id_num) and a message (key_message) both of length defined by key_a. This key is an embodiment of the form of the access request message according to the inventive concept. The id_num is issued by the head end 2 at initialization of the respective secondary station. The content of the key_message is defined by the secondary station and can be, for instance, a priority indication or a buffer status.

Key_c is the group id, with a maximum length of the id_num which is issued at initialization. It corresponds to the group indication according to the inventive concept. The maximum length of both the id_num and the key_message is 2 bytes, so that a maximum length of 4 bytes is possible. The maximum length of key_a is defined by the length of a request cell. The head end 2 signals to the secondary stations 4 . . . 12 which cells are meant for requests. By using key #1 and key #2 the secondary stations 4 . . . 12 can submit an access request.

As a further extension to this system multiple key sets are proposed. The head end 2 can download these key sets to a secondary station and by enabling the proper key set the MAC protocol is defined. Changing from one MAC protocol to another can be obtained by changing the key set and the algorithm in the head end 2. Therefore the key sets can be addressed by a so called key_address. The key address corresponds to the protocol indicator according to the inventive concept. It is proposed to have a 2 bit address thus making it possible to have 4 key sets.

For certain protocols it is necessary to select different parts of a request cell at random or by a fixed pattern. This functionality is offered by the introduction of the sequence identifier: key_seq (issued by the head end 2), which consists of a sequence of key_addresses. Initially the first key_address is called the active key_address. Each time a secondary station is allowed to transmit a request (as is indicated by the state machine) it uses the key_address that is active in the key_seq. After this action the next key_address is activated. The key_seq is 2 bytes long thus offering 64000 different sequences, which is enough to guarantee pseudo randomness.

It is observed that also the functionality can be implemented that nothing is transmitted although it is allowed by the state machine of the secondary station. This can be done by programming in one of the key sets the all "0" key for key_a.

The purpose of key_c is to enable the use of each of a number of consecutive request cells for a different group of subscribers. This allows an even spreading of the subscribers over a plurality of request cells. At the beginning of a so called multi-frame in the downstream direction a counter value called request_num is transmitted by the head end 2. This counter value is loaded into a counter at each secondary station. The counter is incremented after each request cell. The secondary station uses the selected key set (determined by the actual value of key_seq) only if there is a match between the value of request_num and the value of key_c, indicating that the corresponding request cell can be used.

It can easily be seen that by means of these keys we can describe almost every MAC-protocol. The head end 2 can download these keys in the different secondary stations during initialization and if necessary reprogram them during operation via house-keeping messages. Furthermore the head end 2 controls which cells have to be used for requests. So, without any changes in the hardware of the secondary stations itself, the head end 2 can make the secondary stations 4 . . . 12 switch from one MAC protocol to the other by letting it select the proper key set. The additional complexity for handling the various MAC-protocols is completely located in the head end 2. In this way it is possible to implement variations on basic MAC-protocols in the system, without changing anything in the secondary stations itself and still complying to the standard. In Table 1 below a list of the defined variables is given:

| variable | size | definition |
|---|---|---|
| key_a | 36 symbols | a string of "0", "1", and "2" that specifies the symbols that can be used for transmission |
| key_b | max. 32 bit | is an id number ($id_{13}$ num) and a message (key_message) both of length defined by key_a |
| key_c | max. 16 bit | is the group id, with a maximum length of the id_num which is issued at initialization |
| key_address | 2 bit | is defined as the address of a key set |
| key_seq | 16 bit | consists of a sequence of 8 key_addresses |
| request_num | 16 bit | is defined as the start value of the request counter |
| id_num | 16 bit | is defined as the logical address of the secondary station |
| key_message | max. 16 bit | is defined as the message to be transmitted by the secondary station |

In order to explain the functions described above two examples are given. This section describes the first example using only one key set used to implement the protocol according to FIG. 1.

Suppose a network comprising 128 secondary stations and a 9-byte request cell is used. It is assumed that the modulation code is DQPSK, i.e. 2 bits per symbol. This means that in a request cell 36 symbols can be transmitted. Furthermore it is assumed that within the duration of 2 symbols the carrier can be switched on, transmit one symbol and can be switched off again. Note that a carrier detect at the receiver is sufficient and hence it is not necessary to receive also the value of the symbol. With these 9-byte request-cells and 2 symbols per request we can store 16 requests per request-cell. This means that the secondary stations have to be divided into 8 groups having group id 0 for secondary station 0 . . . 15, group id 1 for secondary station 16 . . . 31, etc. The key set is always the same for a particular secondary station, so only one key set is necessary.

Thus the protocol according to FIG. 1 can be implemented by allocating the following values for secondary station #2:

| variable | size | value |
|---|---|---|
| key_a | 36 symbols | 0000 0000 0000 0000 0000 0000 0000 0001 0000 |
| key_b | max. 32 bit | 1 |
| key_c | max. 16 bit | 000 |
| key_address | 2 bit | 00 |
| key_seq | 16 bit | 00 00 00 00 00 00 00 00 |
| id_num | 16 bit | 0000 0000 0000 0010 |
| key_message | max. 16 bit | n.a. |

To secondary station #70 the following values are allocated:

| variable | size | value |
|---|---|---|
| key_a | 36 symbols | 0001 0000 0000 0000 0000 0000 0000 0000 0000 |
| key_b | max. 32 bit | 1 |
| key_c | max. 16 bit | 011 |
| key_address | 2 bit | 00 |
| key_seq | 16 bit | 00 00 00 00 00 00 00 00 |

-continued

| variable    | size        | value               |
|-------------|-------------|---------------------|
| id_num      | 16 bit      | 0000 0000 0100 0110 |
| key_message | max. 16 bit | n.a.                |

Suppose that the value of request_num is "0" when the multi-frame passes. Secondary station #2 transmits its request in the first available request cell as a 1 value on the fourth symbol position from the right. On the other symbol the transmitter is off. Secondary station #70 transmits its request in the fourth request cell (having group id 011) and uses the fourth symbol from the left to transmit a "1" symbol. Note that the key_seq addresses the only key that is programmed in both cases.

In the example below the use of multiple keys is described for implementing an access protocol according to FIG. 2.

Suppose again that a network comprising 128 secondary stations is considered and a 9 byte access-cell is used. It is assumed that the modulation code is DQPSK, i.e. 2 bits per symbol. Furthermore it is assumed that within the duration of 18 symbols the carrier can be switched on, transmit 16 symbol and can be switched off again. With these 9-byte request-cells and 18 symbols per request we can transmit 2 requests per request cell. This means that if three request slots are used two group id's can be used. Since also the "no request transmission" has to be addressable, four key sets are programmed in this example.

The protocol according to FIG. 2 can be implemented by allocating the following values to secondary station #2:

| variable    | size         | value                                   |
|-------------|--------------|-----------------------------------------|
| key_a       | 36 symbols   | 0000 0000 0000 0000 0000 0000 0000 0000 0000 |
| key_b       | max. 32 bit  | n.a.                                    |
| key_c       | max. 16 bit  | 0                                       |
| key_address | 2 bit        | 00                                      |
| key_a       | 36 symbols   | 0000 0000 0000 0000 0001 1111 1112 2222 2220 |
| key_b       | max. 32 bit  | 0000 0000 0000 0010 xxxx xxxx xxxx xxxx |
| key_c       | max. 16 bit  | 0                                       |
| key_address | 2 bit        | 01                                      |
| key_a       | 36 symbols   | 0111 1111 1222 2222 2000 0000 0000 0000 0000 |
| key_b       | max. 32 bit  | 0000 0000 0000 0010 xxxx xxxx xxxx xxxx |
| key_c       | max. 16 bit  | 0                                       |
| key_address | 2 bit        | 10                                      |
| key_a       | 36 symbols   | 0000 0000 0000 0000 0001 1111 1112 2222 2220 |
| key_b       | max. 32 bit  | 0000 0000 0000 0010 xxxx xxxx xxxx xxxx |
| key_c       | max. 16 bit  | 1                                       |
| key_address | 2 bit        | 11                                      |
| key_seq     | 16 bit       | 01 00 10 11 11 00 01 10                 |
| id_num      | 16 bit       | 0000 0000 0000 0010                     |
| key_message | max. 16 bit  | <priority>                              |

To secondary station #70 the following values are allocated:

| variable    | size         | value                                   |
|-------------|--------------|-----------------------------------------|
| key_a       | 36 symbols   | 0000 0000 0000 0000 0000 0000 0000 0000 0000 |
| key_b       | max. 32 bit  | n.a.                                    |
| key_c       | max. 16 bit  | 0                                       |
| key_address | 2 bit        | 00                                      |
| key_a       | 36 symbols   | 0000 0000 0000 0000 0001 1111 1112 2222 2220 |
| key_b       | max. 32 bit  | 0000 0000 0100 0110 xxxx xxxx xxxx xxxx |
| key_c       | max. 16 bit  | 0                                       |
| key_address | 2 bit        | 01                                      |
| key_a       | 36 symbols   | 0111 1111 1222 2222 2000 0000 0000 0000 0000 |
| key_b       | max. 32 bit  | 0000 0000 0100 0110 xxxx xxxx xxxx xxxx |
| key_c       | max. 16 bit  | 0                                       |
| key_address | 2 bit        | 10                                      |
| key_a       | 36 symbols   | 0000 0000 0000 0000 0001 1111 1112 2222 2220 |
| key_b       | max. 32 bit  | 0000 0000 0100 0110 xxxx xxxx xxxx xxxx |
| key_c       | max. 16 bit  | 1                                       |
| key_address | 2 bit        | 11                                      |
| key_seq     | 16 bit       | 11 01 00 11 10 10 00 01                 |
| id_num      | 16 bit       | 0000 0000 0100 0110                     |
| key_message | max. 16 bit  | <priority>                              |

Suppose that the value of request_num is "0" when the multi-frame passes. secondary station #2 transmits its access request in the first available request cell as a "0000 0000 0000 0010 0000 0000 0000 0000" value on the right half of a request cell. The value of key_seq (01) has selected this key set and the all "0" sequence is the assumed priority value of the key_message. During the other half of the request cell the transmitter is off. Secondary station #70 transmits its request in the second request cell (having group id 1) and uses the "0000 0000 0100 0110 0000 0000 0000 0000" value on the right half of a request cell. The value of key_seq (11) has selected this key set and the all '0' sequence is the assumed priority value of the key_message.

An alternative definition of the keys following key_a and key_b is presented below.

An offset to be observed by the transmitter (measured in symbols) of the patterns defined by key_a and key_b are defined by using the following two variables: the request cell selector (rcell_sel) which selects the appropriate request cell using a method described below and the offset within a request cell (rcell_offset) which defines the start of the transmission of key_b within the selected cell.

The purpose of rcell_sel is to enable the use of multiple request cells. At the beginning of a multi-frame in the downstream direction is a counter value called request_num. This value is loaded into a counter at each secondary station. The counter is incremented after each request cell and counts modulo request_mod. The secondary station uses the selected key set only if there is a match between the value of request_num and the value of rcell_sel, indicating that the corresponding request cell can be used. Then rcell_offset indicates how much symbols within a request cell have to be shifted before the value of key_b can be transmitted during the period indicated by key_a.

It is assumed that the following sizes are allocated to the variables defined above. The maximum length of both the id_num and the key_message is 2 bytes, so that key_b has a maximum length of 4 bytes. The maximum length of key_a is defined by the length of a request cell which is the length of a mini-cell. The length of both rcell_sel and rcell_offset is assumed to be 1 byte.

The head end 2 signals to the secondary stations which cells are meant for requests. By using both keys the secondary stations can then submit their request.

For certain protocols it is necessary to select different parts of a request cell at random or by a fixed pattern. This functionality is offered by the introduction of the sequence identifier: key_seq (issued by the head end 2), which consists of a sequence of rcell_sel and rcell_values. These values are given as a pair. Initially the first pair value of the key_seq is called the active value. Each time a secondary station is allowed to transmit a request (as is indicated by the state machine) it uses the active value of the key_seq. After this action the next pair value is activated. The key_seq consists of 32 pairs of rcell_sel and rcell_offset thus offering sequences that are long enough to guarantee randomness.

It is observed that also the functionality is implemented that nothing is transmitted although the state machine of the secondary station allows transmission. This is obtained by using the all "1" value for both rcell_sel and rcell_. This value is not a valid value for using a regular shift since it will always cause the key b value to be out of a request cell. Therefore it can be used for the purpose of no transmission at all.

Below a list of the alternative definition of the variables are presented:

| variable | size | definition |
| --- | --- | --- |
| key_a | 36 symbols | a string of "0", "1", and "2" that specifies the symbols that can be used for transmission |
| key_b | max. 32 bit | is an id number (id_num) and a message (key_message) both of length defined by key_a |
| key_seq | 64 bytes | consists of a sequence of 32 pairs of rcell_sel and rcell_offset |
| key_address | 2 bit | is defined as the address of a key set |
| request_mod | 8 bit | defines the modulo value of the counter to select the appropriate request |
| rcell_sel | 8 bit | defines the request cell to be used, based on the value of the modulo count. |
| rcell_offset | 8 bit | defines the symbol position where the transmission of key_b is started within a request cell |
| request_num | 16 bit | is defined as the start value of the request counter |
| id_num | 16 bit | is defined as the logical address of the secondary station |
| key_message | max. 16 bit | is defined as the message to be transmitted by the secondary station |

The variables defined above are all loaded in the secondary stations by using the house-keeping messages. The commands used for this purpose have a similar structure is described in the section on housekeeping messages.

In the downstream direction it is advantageous to distinguish between two different classes of MAC cells, viz. MAC1 and MAC2. The MAC1 cells contain acknowledges on requests. The MAC2 cells are used to allocate ATM transport cells in the upstream direction to certain secondary stations. These operations associated with these two types of MAC cells are deliberately decoupled to offer the possibility to acknowledge a request and postpone the actual bandwidth allocation to be able to give a higher priority to later incoming requests for bandwidth.

The request acknowledge cells (MAC1) are a reflected version of the upstream request cells. The secondary station checks whether its transmitted request message matches with the reflected message. If yes, it knows that its request is seen by the head end. It now has to wait until the head end allocates the requested amount of ATM cells. If the reflected message does not match with the transmitted message, the secondary station concludes that the message is not seen by the head end 2 and depending on the state machine in the secondary station it retransmits its request in one of the following request slots.

In the reflected message there will be space reserved to indicate whether the non-acceptance of a request message was due to a collision or a bit error. By means of this indicator the secondary stations can monitor whether they are in a collision resolution period where no new secondary stations are allowed to transmit requests or that a collision resolution period has just ended.

The MAC2 cells containing cell allocation information use two bytes to address a secondary station. Additionally by means of some special bits in the mini-cell header it is also possible to address all secondary stations or groups of secondary stations via one address. These options are necessary to support for instance ALOHA-like protocols. There are as many of these MAC2 cells in a basic frame as are needed to assign all available ATM cells in the next upstream basic frame. Suppose we have 9-byte cells including a one-byte header, then one such cell can transmit 4 secondary station addresses, enough to allocate 4 ATM cells upstream. Note that with this structure of two classes of MAC-cells we can support different protocols:

Polling:
 No request cells in upstream or downstream direction, only MAC2 cells to assign an ATM cell to a particular secondary station.

The protocol according to FIG. 1
 Request cells upstream and the corresponding MAC1 cells for acknowledgment downstream. In this case there are no collisions. The MAC2 cells assign ATM cells to secondary stations which have asked for bandwidth.

The protocol according to FIG. 2
 Request cells upstream used as contention area. Downstream acknowledgments in MAC1 cells to indicate correct reception or collision. Depending on the acknowledgment result the secondary station waits for a ATM cell assignment or retransmits according to its state machine.

ALOHA:
 No request cells upstream and no MAC1 cells downstream. Via the MAC2 cells all ATM cells are made available for all secondary stations.

Figure 4:
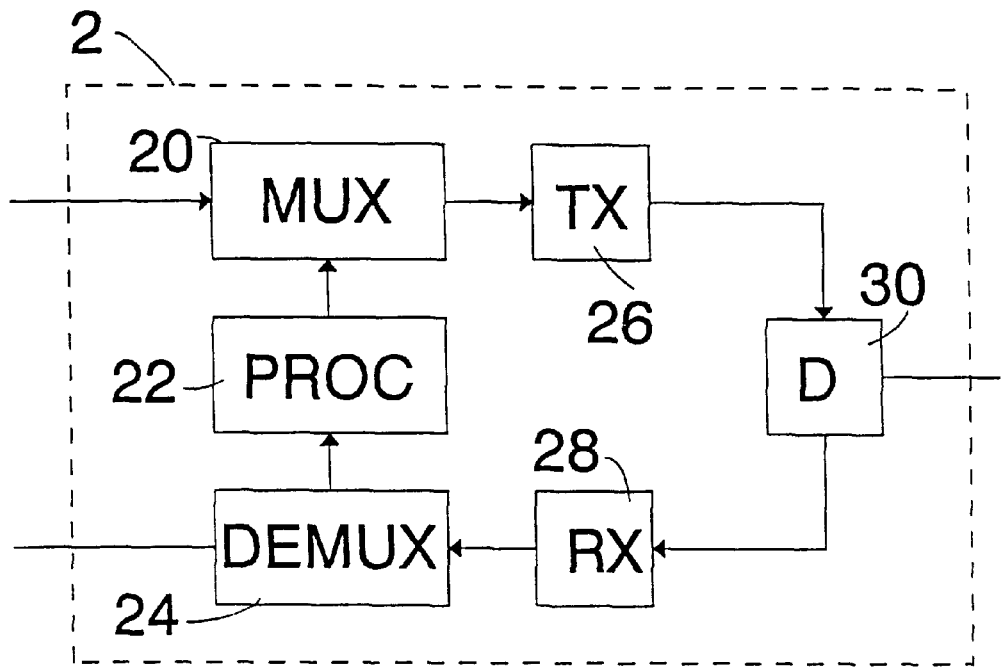
FIG. 4, a block diagram of the primary station 2 in FIG. 1.

In the head end 2 according to FIG. 4, the downstream signal is applied to a first input of a multiplexer 20. An output of a processor 22 is connected to a second input of the multiplexer 20. The output of the multiplexer 20 is connected to an input of a transmitter 26. The output of the transmitter 26 is connected to an input of a duplexer 30. The output of the duplexer 30 is connected to the transmission medium 14.

The transmission means for transmitting a channel indication is constituted by the combination of the processor 22, the multiplexer 20 and the transmitter 26.

An output of the duplexer 30 is connected to an input of a receiver 28. The output of the receiver 28 is connected to an input of a demultiplexer 24. A first output of the multiplexer 24 is connected to the processor 22. A second output of the multiplexer 24 carries a signal to be transmitted by a higher layer network.

The payload signals and the control signals (MAC1, MAC2 cells, ranging signals etc) are multiplexed in a downstream frame by the multiplexer 20. The control signals are provided by the processor 22. The output signal of the multiplexer is modulated on one or more carriers by the transmitter 26 and subsequently applied to the transmission medium via the duplexer 30.

The duplexer 30 applies its output signal to the input of the receiver 28. The receiver is arranged for demodulating one or more carriers, because a plurality of carriers can be used for different groups of secondary stations. The output signal(s) of the receiver 28 is/are demultiplexed by the demultiplexer 24. The control information, such as access requests, channel release messages, status information etc.) available at the first output of the demultiplexer 24 is applied to the processor 22.

The processor 22 performs the handling of the access requests, the allocation of transmission capacity to the secondary stations, the initialisation and updating of the keys in the secondary stations. Also the ranging procedure is initiated and controlled by the processor 22.

Figure 5:
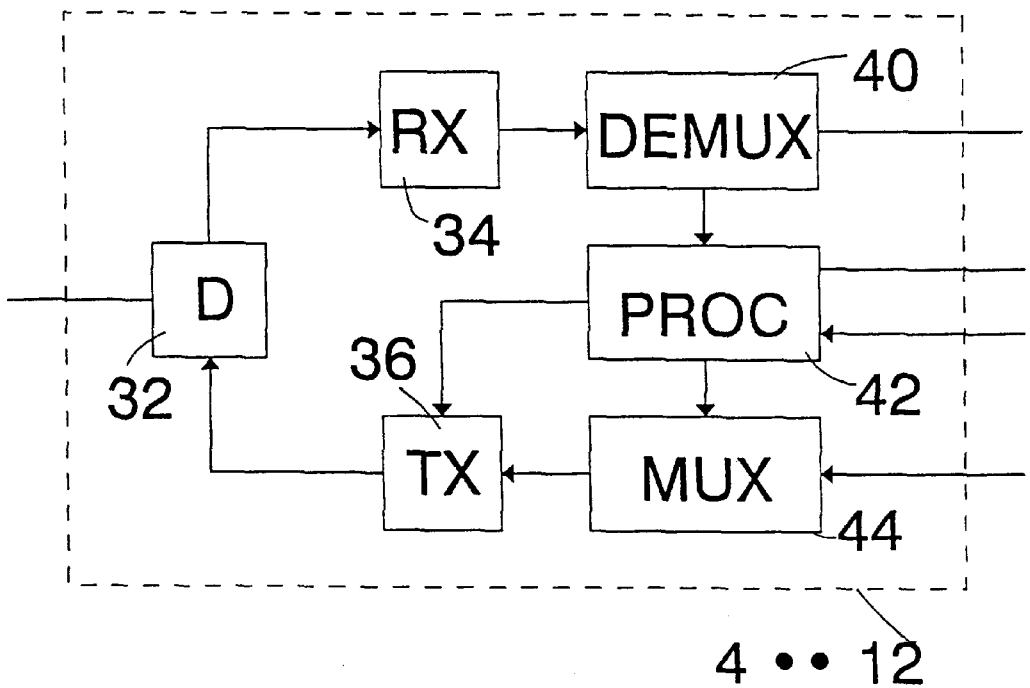
FIG. 5, a block diagram of the secondary stations 4 . . . 12 in FIG. 1.

In the secondary station 4 . . . 12 according to FIG. 5, the signal to be transmitted upstream are applied to a first input of a multiplexer 44. The output of the multiplexer 44 is connected to an input of a transmitter 36. The output of the transmitter 36 is connected to an input of a duplexer 32, whose input/output is connected to the transmission medium 14. A first subscriber control signal is applied to a processor 42. A first output of the processor 42 is connected to a second input of the multiplexer 44. A second output of the processor 42 is connected to the transmitter 36, and a third output of the processor 42 carries a second subscriber control signal.

An output of the duplexer 32 is connected to an input of a receiver 34. The output of the receiver 34 is connected to an input of a demultiplexer 40. A first output of the demultiplexer 40 is connected to a second input of the processor 42. A second output of the demultiplexer 40 carries the payload data.

The access request means comprise the processor 42, the multiplexer 44 and the transmitter 36. The indication receive means comprise the receiver 34, The downstream signal transmitted by the head end 2, is passed to the receiver 34 by the duplexer 34. Said downstream signal is demodulated in the receiver 34, and the resulting digital symbols are passed to the demultiplexer 40. The demultiplexer 40 separates the control data and the payload data present in the output signal of the receiver. The control data is transmitted to the processor and the pay load data is made available for a subscriber terminal.

If the subscriber terminal has data to be transmitted to the head end 2, this is signalled to the processor using the first subscriber control signal. In response to said signal the processor will submit an access request. This is done by switching on the transmitter according to the channel indicator the processor 42 has previously received from the head end 2. Via the multiplexer 44 the access request message is passed to the input of the transmitter 36. The access request message has also previously been received from the head end 2. At the output of the transmitter 36 the request message is available and is passed via the transmission medium to the head end.

If the head end 2 allocates transmission capacity to the secondary station, the processor 42 signals to the subscriber terminal that it can transmit data. This data is multiplexed with control information, and is transmitted to the head end 2.

We claim:

1. A multiple access telecommunication network comprising at least one primary station coupled via an at least partially common transmission medium to a plurality of secondary stations;

characterized in that:
   the primary station comprises transmission means for transmitting an access channel indication and an indication of a form of an access request message to at least one of the secondary stations; and
   each of said at least one secondary station comprises receiving means for receiving the access channel indication and the indication of the form of the access request message transmitted by the primary station, and access request means for transmitting an access request to the primary station on a channel corresponding to the received access channel indication, the access request having a form in accordance with the received indication of the form of the access request message.

2. A telecommunication network according to claim 1, wherein the access request means of a secondary station is adapted to modulate a signal representing an access request on a carrier burst, and the access channel indication indicates a starting instant and a duration of the carrier burst.

3. A telecommunication network according to claim 1, wherein the indication of the form of the access request message is in the form of a string of symbols representing an access message.

4. A telecommunication network according to claim 1, wherein the accede channel indication comprises a memory address of a channel key previously stored in a memory of said secondary station specifying a starting instant and a duration of an access request message.

5. A telecommunication network according to claim 1, wherein the indication of the form of the access request message comprises a memory address of a channel key previously stored in a memory of said secondary station specyfying an access request message.

6. A telecommunication network according to claim 1, wherein the access channel indication and the indication of the form of the access request message are represented by a single protocol indicator.

7. A telecommunication network according to claim 1, wherein the access channel indication comprises a group indication of channels for access requests, and the access request means of a secondary station is adapted to transmit an access request only in a channel indicated by the group indication.

8. A primary station for use in a multiple access telecommunication network which also includes a plurality of secondary stations which are coupled to the primary station via an at least partially common transmission medium; said primary station comprising;

transmission means for transmitting an access channel indication and an indication of a form of an access request message to at least one of the secondary stations; and receiving means for receiving from each of said at least one secondary station an access request signal via a channel indicated by said channel indication, the access request having a form in accordance with the indication of the form of the access request message as received by said at least one secondary station from the primary station.

9. A secondary station for use as at least one of a plurality of secondary stations in telecommunication network which also includes a primary station which is coupled to the secondary stations via an at least partially common transmission medium; said at least one secondary station comprising:

receiving means for receiving an access channel indication and an indication of a form of an access request message from the primary station; and access request means for transmitting to the primary station an access request to access said transmission medium for message transmission, said access request being transmitted on a channel corresponding to the received access channel indication, the access request having a form in accordance with the received indication of the form of the access request message.

10. A method of multiple access communication in telecommunication network comprising a primary station which is coupled to a plurality of secondary stations via an at least partially common transmission medium; said method comprising:

transmission of an access channel indication and an indication of a form of an access request message from the primary station to at least one of the secondary stations;

reception of the access channel indication and the indication of the form of the access request message by each of said at least one secondary station; and transmission by each of said at least one secondary station to the primary station of an access request to the primary station on a channel corresponding to the received access channel indication, the access request having a form in accordance with the received indication of the form of the access request message.

* * * * *

UNITED STATES PATENT AND TRADEMARK OFFICE
CERTIFICATE OF CORRECTION

PATENT NO.    : 5,917,813
DATED         : June 29, 1999
INVENTOR(S)   : Carel J.L. Van Driel and Petrus A.M. Van Grinsven It is certified that error appears in the above-identified patent and that said Letters Patent is hereby corrected as shown below:

<u>Column 12,</u>
Line 33, change "accede" to -- access --.

Signed and Sealed this

Twenty-third Day of July, 2002

Attest:

JAMES E. ROGAN
Attesting Officer  Director of the United States Patent and Trademark Office